(12) United States Patent
Sano (10) Patent No.: US 11,146,767 B2
(45) Date of Patent: Oct. 12, 2021

(54) PROJECTION POSITION DETECTION DEVICE, IMAGE PROJECTION SYSTEM, AND PROJECTION POSITION DETECTION METHOD

(71) Applicant: Seiko Epson Corporation, Tokyo (JP)

(72) Inventor: Akira Sano, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/775,333

(22) Filed: Jan. 29, 2020

(65) Prior Publication Data

US 2020/0244936 A1 Jul. 30, 2020

(30) Foreign Application Priority Data

Jan. 30, 2019 (JP) .............................. JP2019-013984

(51) Int. Cl.
  *H04N 9/31* (2006.01)
  *G01J 3/51* (2006.01)
  *G01J 3/50* (2006.01)
  *G06T 7/73* (2017.01)

(52) U.S. Cl.
  CPC ............ *H04N 9/3185* (2013.01); *G01J 3/506* (2013.01); *G01J 3/51* (2013.01); *G06T 7/73* (2017.01)

(58) Field of Classification Search
  CPC .. H04N 9/3185; H04N 9/3194; H04N 9/3179; G01J 3/51; G01J 3/506; G01J 3/027; G01J 3/26; G01J 3/2823; G06T 7/73; G06T 2207/10024
  See application file for complete search history.

(56) References Cited

U.S. PATENT DOCUMENTS

| | | | | |
|---|---|---|---|---|
| 2008/0291342 | A1* | 11/2008 | Hirai | H04N 9/3194 348/745 |
| 2012/0127323 | A1* | 5/2012 | Kasuya | H04N 9/3185 348/189 |
| 2017/0364736 | A1* | 12/2017 | Ollila | H04N 5/33 |
| 2018/0139424 | A1* | 5/2018 | Urquhart | H04N 9/3147 |
| 2019/0098270 | A1* | 3/2019 | Grundhofer | G06T 7/70 |

FOREIGN PATENT DOCUMENTS

| | | |
|---|---|---|
| JP | 2004-341029 A | 12/2004 |
| JP | 2008-287426 A | 11/2008 |
| JP | 2013-247601 A | 12/2013 |

\* cited by examiner

*Primary Examiner* — John W Miller
*Assistant Examiner* — Humam M Satti
(74) *Attorney, Agent, or Firm* — Harness, Dickey & Pierce, P.L.C.

(57) ABSTRACT

A projection position detection device includes: a spectroscopic camera receiving light from an image pickup range including a projection image projected onto a projection target, and picking up a plurality of spectral images corresponding to different wavelengths from each other; a spectrum computation unit computing an optical spectrum of each pixel, based on the plurality of spectral images; a feature point detector detecting a feature point in the image pickup range, based on the optical spectrum of the pixel; and a projection position calculator calculating a relative position of the projection image to the feature point.

7 Claims, 8 Drawing Sheets

PROJECTION POSITION DETECTION DEVICE, IMAGE PROJECTION SYSTEM, AND PROJECTION POSITION DETECTION METHOD

The present application is based on, and claims priority from, JP Application Serial Number 2019-013984, filed Jan. 30, 2019, the disclosure of which is hereby incorporated by reference herein in its entirety.

BACKGROUND

1. Technical Field

The present disclosure relates to a projection position detection device, an image projection system, and a projection position detection method.

2. Related Art

According to the related art, there is an image projection system controlling the position or the like of a projection image projected by a projector.

For example, JP-A-2004-341029 describes a system that detects the position of a screen, using a camera, and controls the position of a projection image in relation to the screen. This system detects each corner of a rectangular screen, based on an image picked up by each of two cameras, then calculates the distance from each camera to each corner, and thus calculates a relative position of the screen to the projector. Based on the calculated relative position, the angle, the amount of zoom, and the like of a projection lens are adjusted. Thus, an image fitting a projection area on the screen is projected.

However, in the system described in JP-A-2004-341029, when an image is projected onto a uniform wall surface or the like instead of the screen, a projection position of the image cannot be set since there is no reference point for detecting the projection position of the image. Therefore, when the projection position of the image is shifted due to vibration at the installation site or a touch by a human or the like, it is difficult to detect this shift.

SUMMARY

A projection position detection device according to an aspect of the present disclosure includes: a spectroscopic camera receiving light from an image pickup range including a projection image projected onto a projection target, and picking up a plurality of spectral images corresponding to different wavelengths from each other; a spectrum computation unit computing an optical spectrum of each pixel, based on the plurality of spectral images; a feature point detection unit detecting a feature point in the image pickup range, based on the optical spectrum of the pixel; and a projection position calculation unit calculating a relative position of the projection image to the feature point.

In the projection position detection device, the spectroscopic camera may include: a variable-wavelength interference filter having a pair of reflection films facing each other and a gap changing unit changing a dimension of a gap between the pair of reflection films; and an image pickup element picking up an image of light transmitted through the variable-wavelength interference filter.

In the projection position detection device, the spectroscopic camera may pick up the spectral image corresponding to a wavelength in a near-infrared range.

The projection position detection device may further include a light source casting light including a wavelength in a near-infrared range, onto the projection target.

An image projection system according to another aspect of the present disclosure includes: the foregoing projection position detection device; a projection lens projecting the projection image onto the projection target; a lens adjustment mechanism performing optical axis adjustment or zoom adjustment of the projection lens; and a lens control unit controlling the lens adjustment mechanism, based on an amount of change in the relative position of the projection image to the feature point.

An image projection system according to another aspect of the present disclosure includes: the foregoing projection position detection device; and an image processing unit correcting the projection image, based on an amount of change in the relative position of the projection image to the feature point.

A projection position detection method according to another aspect of the present disclosure includes: an image pickup step of receiving light from an image pickup range including a projection image projected onto a projection target, and picking up a plurality of spectral images corresponding to different wavelengths from each other; a spectrum computation step of computing an optical spectrum of each pixel, based on the plurality of spectral images; a feature point detection step of detecting a feature point in the image pickup range, based on the optical spectrum of the pixel; and a projection position calculation step of calculating a relative position of the projection image to the feature point.

DESCRIPTION OF EXEMPLARY EMBODIMENTS

An embodiment of the present disclosure will now be described with reference to the drawings.

Figure 1:
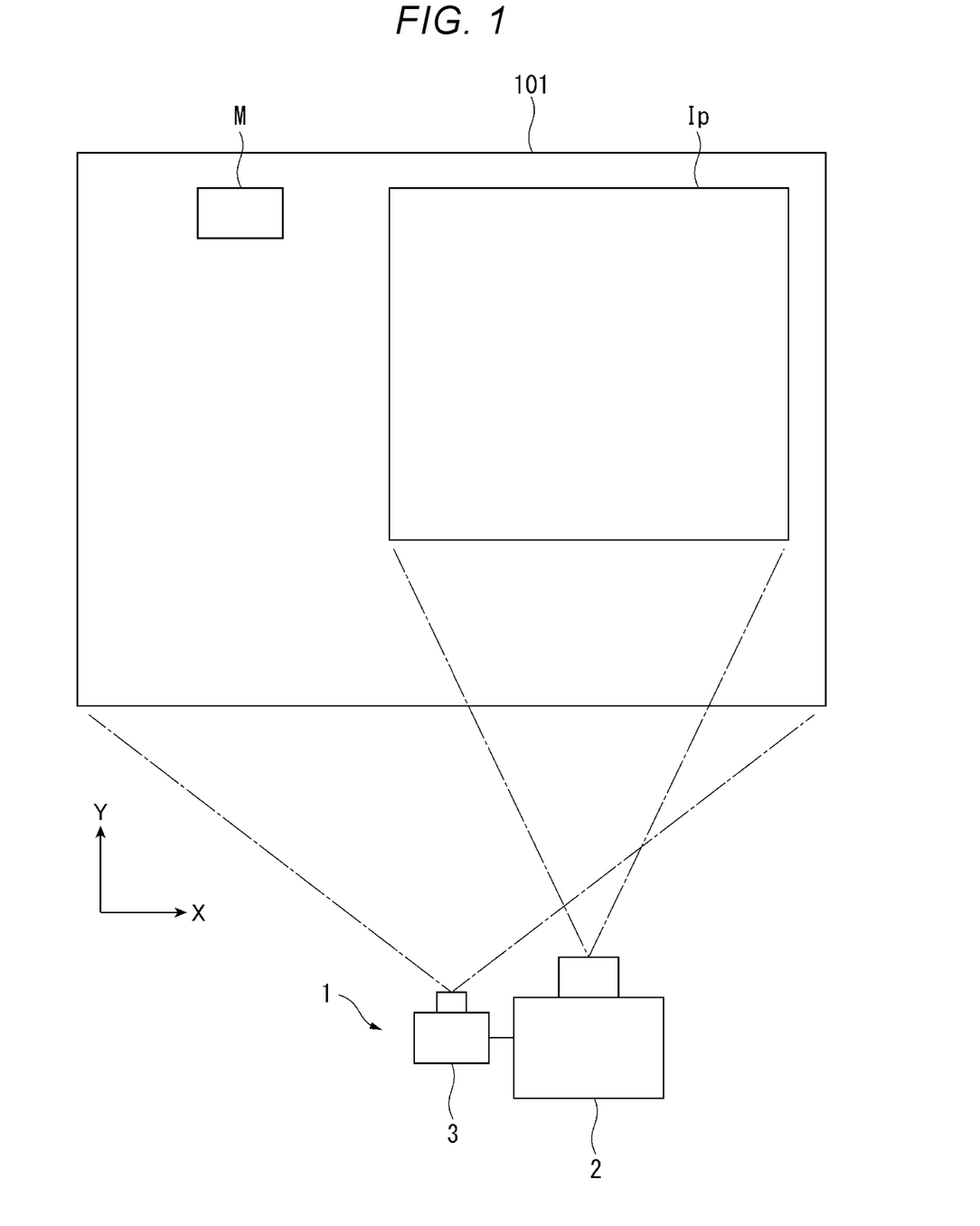
FIG. 1 is a schematic view showing an image projection system and a projection target according to an embodiment of the present disclosure.
Figure 2:
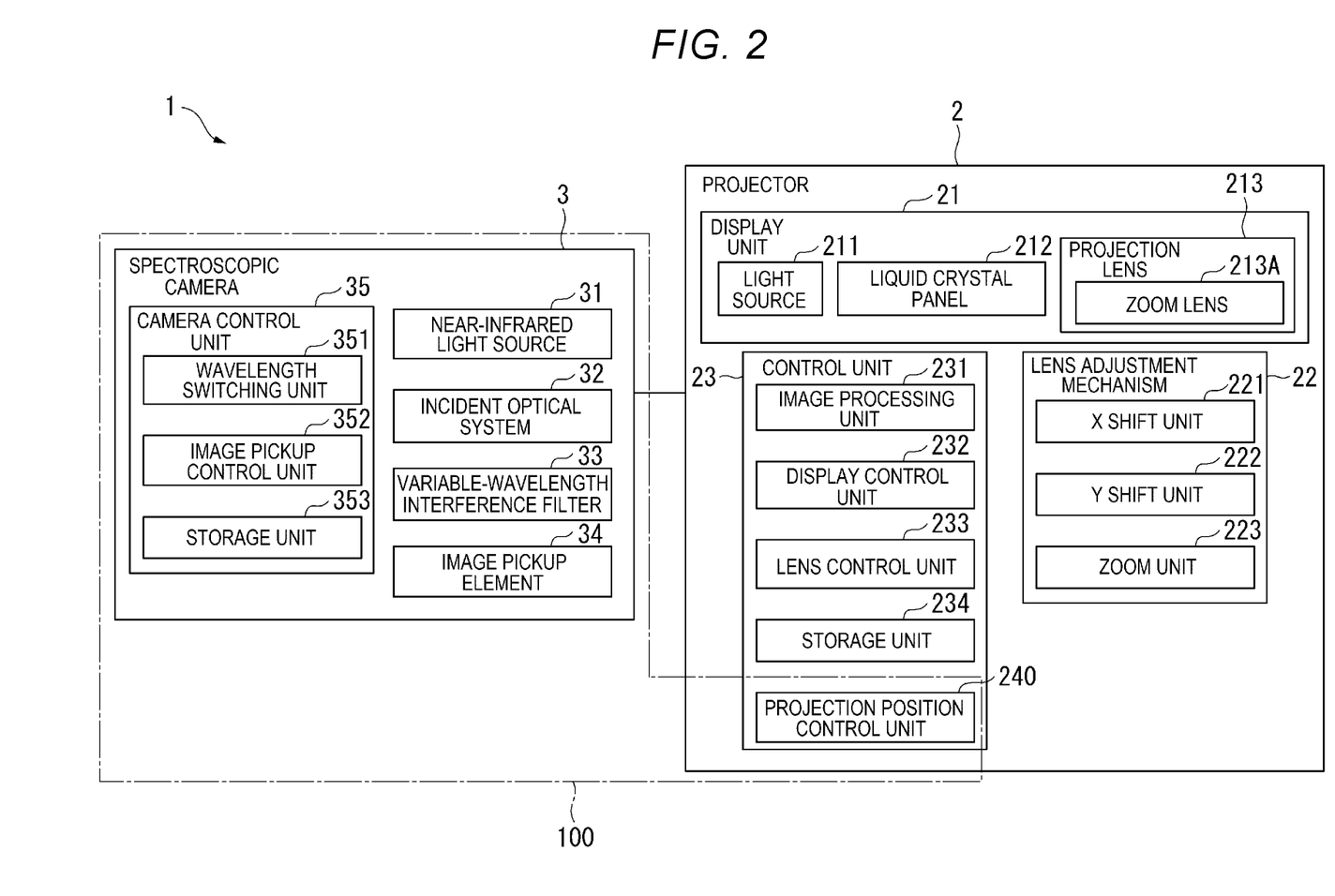
FIG. 2 is a block diagram showing a schematic configuration of the image projection system according to the embodiment.

FIG. 1 is a schematic view showing an image projection system 1 and a projection target 101 according to the embodiment. FIG. 2 is a block diagram showing a schematic configuration of the image projection system 1.

The image projection system 1 according to the embodiment has a projector 2 and a spectroscopic camera 3 coupled to the projector 2, as shown in FIG. 1.

The image projection system 1 includes the projection position detection device according to the present disclosure and is configured to control the position of a projection image Ip projected on the projection target 101 such as a wall surface by the projector 2, based on a spectral image picked up by the spectroscopic camera 3.

Configuration of Projector 2

The projector 2 has a display unit 21, a lens adjustment mechanism 22, and a control unit 23, as shown in FIG. 2. Although not illustrated in the drawing, the projector 2 also has a power-supply device supplying electric power to an electronic component forming the projector 2, and a cooling device cooling a cooling target, and the like.

The display unit 21 forms and projects an image corresponding to a drive signal inputted from the control unit 23. The display unit 21 has a light source 211, a liquid crystal panel 212, and a projection lens 213.

The light source 211 illuminates an image forming area on the liquid crystal panel 212. As the light source 211, a configuration having a light source lamp such as an ultra-high-pressure mercury lamp and a reflection mirror reflecting the light emitted from the light source lamp into one direction can be employed. Also, a configuration having a solid-state light source such as LED (light-emitting diode) and LD (laser diode) can be employed as an example. The liquid crystal panel 212 is a light modulation device driven in response to the drive signal and modulating the light incident thereon from the light source 211.

The projection lens 213 is an optical projection device projecting an image formed at the liquid crystal panel 212 onto a projection target surface of a screen, in an enlarged form. As an example of the projection lens 213, a lens assembly having a lens barrel and a plurality of lenses arranged inside the lens barrel can be employed. As one of such a plurality of lenses, the projection lens 213 has a zoom lens 213A enlarging/reducing the incident image and projecting the enlarged/reduced image onto the projection target surface. The zoom lens 213A moves forward and backward along the optical axis of the projection lens 213.

The lens adjustment mechanism 22 moves the projection lens 213 along an X-axis orthogonal to the optical axis of the projection lens 213 and along a Y-axis orthogonal to the optical axis and orthogonal to the X-axis and thus adjusts the projection position. The lens adjustment mechanism 22 also moves the zoom lens 213A along a Z-axis, which is along the optical axis of the projection lens 213, and thus enlarges/reduces the projection image.

That is, the lens adjustment mechanism 22 has an X shift unit 221 shifting the optical axis of the projection lens 213 along the X-direction, a Y shift unit 222 shifting the optical axis of the projection lens 213 along the Y-direction, and a zoom unit 223 moving the zoom lens 213A along the Z-axis.

When the optical axis of the projection lens 213 is shifted to the +Y side, the projection image Ip is moved to the +Y side. Similarly, when the optical axis of the projection lens 213 is shifted to the −Y side, the projection image Ip is moved to the −Y side.

When the projection lens 213 is moved to the +X side, the projection image Ip is moved to the +X side. Similarly, when the projection lens 213 is moved to the −X side, the projection image Ip is moved to the −X side.

When the zoom lens 213A is moved to one side along the Z-axis by the lens adjustment mechanism 22 and the angle of view is expanded, the size of the projection image Ip increases. Meanwhile, when the zoom lens 213A is moved to the other side along the Z-axis and the angle of view is narrowed, the size of the projection image Ip decreases.

The lens adjustment mechanism 22 is not particularly limited to any specific configuration. However, for example, the lens adjustment mechanism 22 has an X-axis guide holding the projection lens 213 in such a way as to be movable along the X-axis, a Y-axis guide holding the projection lens 213 in such a way as to be movable along the Y-axis, and a Z-axis guide moving the zoom lens 213A along the Z-axis inside the projection lens 213. Each axis guide is provided with a stepper motor supplying a driving force to drive the projection lens 213 or the zoom lens 213A. In this example, the lens adjustment mechanism 22 drives the stepper motor corresponding to each axis by a predetermined amount, based on a lens drive signal from the control unit 23, and thus moves the projection lens 213 or the zoom lens 213A.

The control unit 23 controls the operation of the entirety of the projector 2 including the display unit 21. The control unit 23 is formed as a circuit board where a CPU (central processing unit), a ROM (read-only memory), and a RAM (random-access memory) or the like are mounted. As the CPU in the control unit 23 executes program stored in the ROM, the control unit 23 functions as an image processing unit 231, a display control unit 232, a lens control unit 233, and a projection position control unit 240. The control unit 23 also includes a storage unit 234 storing an initial position of the projection image Ip or the like.

The image processing unit 231 processes image data (including an image signal) received from outside and draws an image for one screen into a frame memory, not illustrated, based on the image data.

The display control unit 232 reads out an image drawn by the image processing unit 231 according to need and sequentially drives the liquid crystal panel 212 to form the image.

The lens control unit 233 controls the operation of the lens adjustment mechanism 22.

The storage unit 234 stores an initial setting of the projection image Ip or the like, described later.

Figure 3:
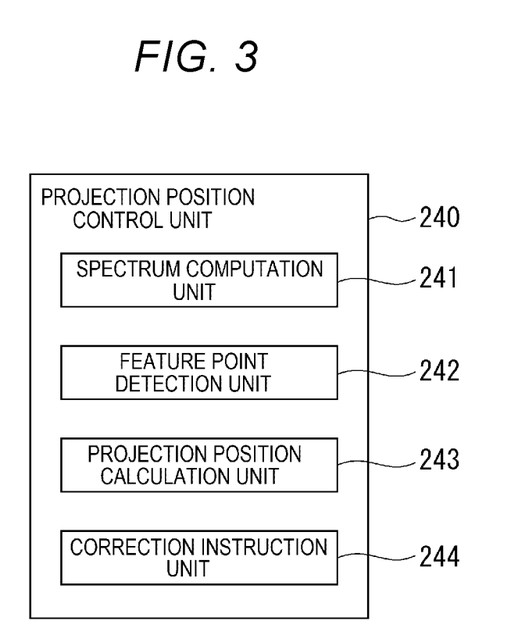
FIG. 3 is a block diagram showing a schematic configuration of a projection position control unit in the embodiment.

The projection position control unit 240 analyzes a spectral image picked up by the spectroscopic camera 3 and outputs a correction instruction to the lens control unit 233 or the image processing unit 231, based on the result of the analysis. Thus, the projection position control unit 240 controls the projection position of the projection image Ip at the projection target 101, or the like. The projection position control unit 240, along with the spectroscopic camera 3, forms a projection position detection device 100. The projection position control unit 240 includes a spectrum computation unit 241, a feature point detection unit 242, a projection position calculation unit 243, and a correction instruction unit 244, as shown in FIG. 3.

Configuration of Spectroscopic Camera 3

The spectroscopic camera 3 includes a near-infrared light source 31, an incident optical system 32, a variable-wavelength interference filter 33, an image pickup element 34, and a camera control unit 35, as shown in FIG. 2.

The near-infrared light source 31 is a light source casting near-infrared light to an image pickup range of the spectroscopic camera 3.

Figure 4:
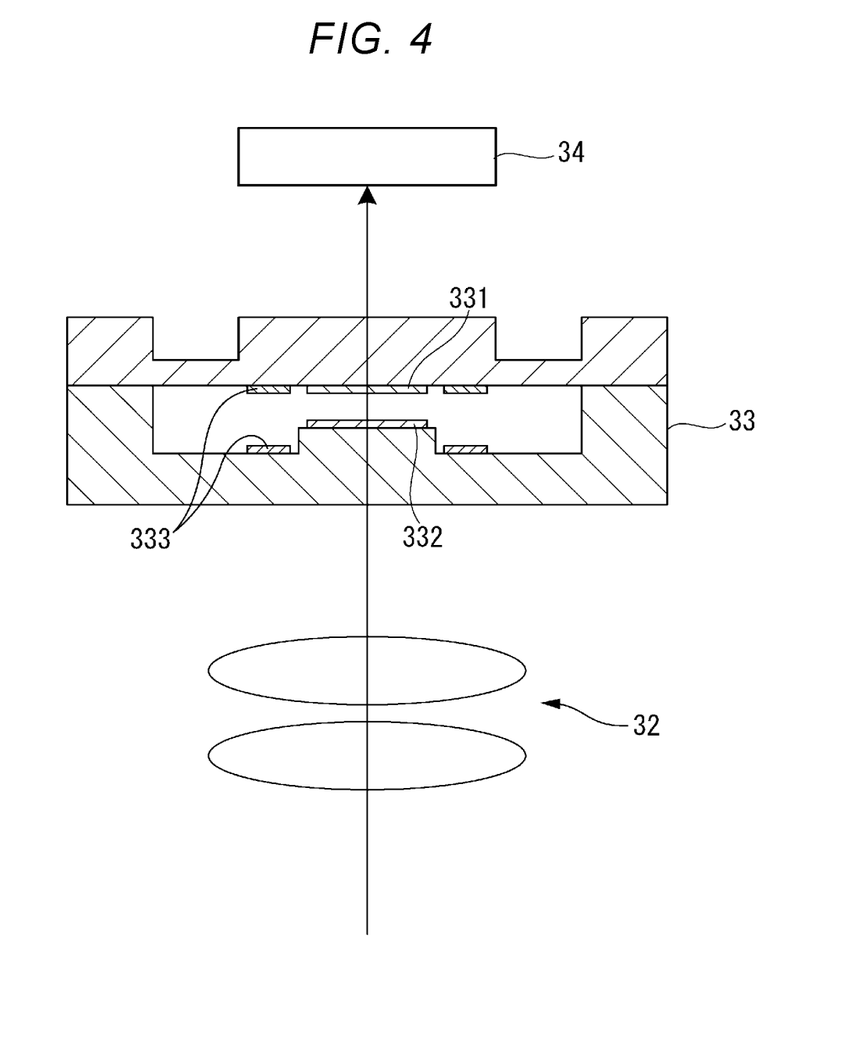
FIG. 4 is a schematic view showing a schematic configuration of a spectroscopic camera in the embodiment.

FIG. 4 is a schematic view showing the configuration of each of the incident optical system 32, the variable-wavelength interference filter 33, and the image pickup element 34.

The incident optical system 32 is formed of, for example, a telecentric optical system or the like and guides incident light to the variable-wavelength interference filter 33 and the image pickup element 34 in such a way that the optical axis and a main beam become parallel or substantially parallel to each other.

The variable-wavelength interference filter 33 is a Fabry-Perot etalon filter and has a pair of reflection films 331, 332 facing each other and an electrostatic actuator 333 (the gap changing unit according to the present disclosure) that can change the distance between the reflection films 331, 332. As the voltage applied to the electrostatic actuator 333 is controlled, the variable-wavelength interference filter 33 can change the wavelength (spectral wavelength) of light transmitted through the reflection films 331, 332.

The image pickup element 34 is formed of, for example, an image sensor such as a CCD (charge-coupled device) or CMOS (complementary metal-oxide semiconductor) and picks up an image of image light transmitted through the variable-wavelength interference filter 33. In the spectroscopic camera 3 in this embodiment, the light transmitted through the variable-wavelength interference filter 33 becomes incident on each pixel of the image pickup element 34.

The camera control unit 35 is an integrated circuit including a CPU (central processing unit) and a built-in memory or the like. As the CPU in the camera control unit 35 reads out and executes a computer program recorded in the built-in memory, the camera control unit 35 functions as a wavelength switching unit 351 and an image pickup control unit 352. The camera control unit 35 also includes a storage unit 353.

In the storage unit 353, a drive table showing a correspondence between a wavelength of light transmitted through the variable-wavelength interference filter 33 and a command value to the electrostatic actuator 333 is recorded.

The wavelength switching unit 351 changes the command value inputted to the electrostatic actuator 333 of the variable-wavelength interference filter 33, based on the drive table.

The image pickup control unit 352 acquires a received light signal (spectrum information) outputted from each pixel of the image pickup element 34 and thus obtains a spectral image.

The spectroscopic camera 3 is configured to be able to transmit the acquired spectral image to the projector 2. Specifically, the spectroscopic camera 3 may be wirelessly coupled to the projector 2, using radio waves, infrared light or the like, or may be wired to the projector 2 via a cable line or the like.

Initial Setting of Image Projection System 1

Figure 5:
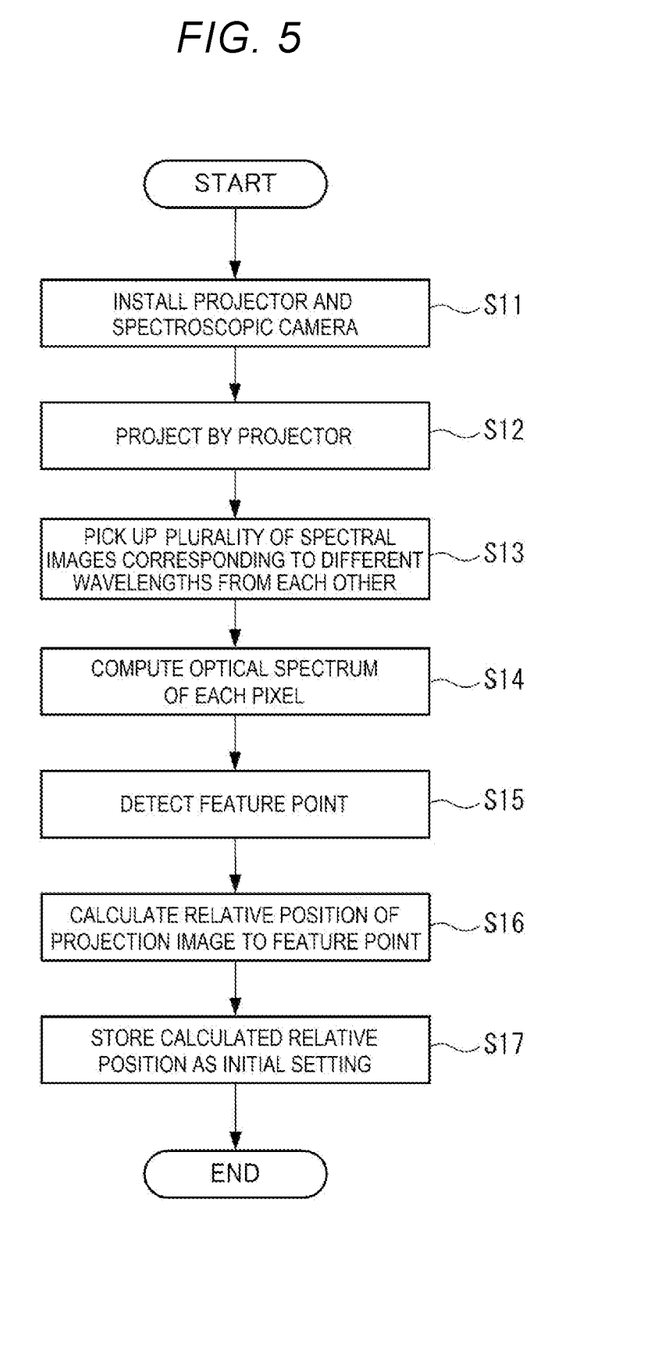
FIG. 5 is a flowchart explaining a flow of initial setting in the image projection system according to the embodiment.

Initial setting of the image projection system 1 will now be described with reference to the flowchart of FIG. 5. The initial setting of the image projection system 1 uses a projection position detection method according to this embodiment. In the description below, it is assumed that the projector 2 projects an image of a permanent exhibition and that the projection target 101 is a uniformly colored planar wall surface.

First, the projector 2 and the spectroscopic camera 3 are installed respectively (step S11).

Specifically, for example, the user installs the projector 2 in such a way that the projection image Ip is displayed in a desired size at a desired position, while checking the projection image Ip projected on the projection target 101. Also, for example, the user installs the spectroscopic camera 3 in such a way that a predetermined range including the projection image Ip projected on the projection target 101 becomes an image pickup range.

Here, it is assumed that the image pickup range of the spectroscopic camera 3 includes not only the projection image Ip but also a marker M. The marker M in this embodiment is a rectangular plate (facility information board or the like) placed at a wall surface that is the projection target 101, as shown in FIG. 1. However, this is not limiting. The marker M may be an unevenness in painting, a stain, a scratch or the like appearing on the wall surface that is the projection target 101.

Subsequently, the projector 2 starts projecting the projection image Ip (step S12). The projector 2 may continue projecting the projection image Ip from step S11.

Next, the spectroscopic camera 3 picks up a plurality of spectral images corresponding to different wavelengths from each other (step S13; image pickup step).

At this time, the near-infrared light source 31 casts near-infrared light of 750 nm to 950 nm onto the image pickup range of the spectroscopic camera 3.

The wavelength switching unit 351 sequentially reads out command values from the drive table and inputs the command values in order into the electrostatic actuator 333 of the variable-wavelength interference filter 33. Thus, the transmission wavelength of the variable-wavelength interference filter 33 is sequentially changed to a plurality of preset wavelengths (target wavelengths). The target wavelengths are set every 20 nm within a range from visible light to near-infrared light (for example, 680 nm to 880 nm).

The image pickup element 34 is controlled by the image pickup control unit 352 and thus performs image pickup every time the transmission wavelength of the variable-wavelength interference filter 33 is set to a target wavelength. Thus, a spectral image corresponding to each target wavelength is picked up.

Figure 6:
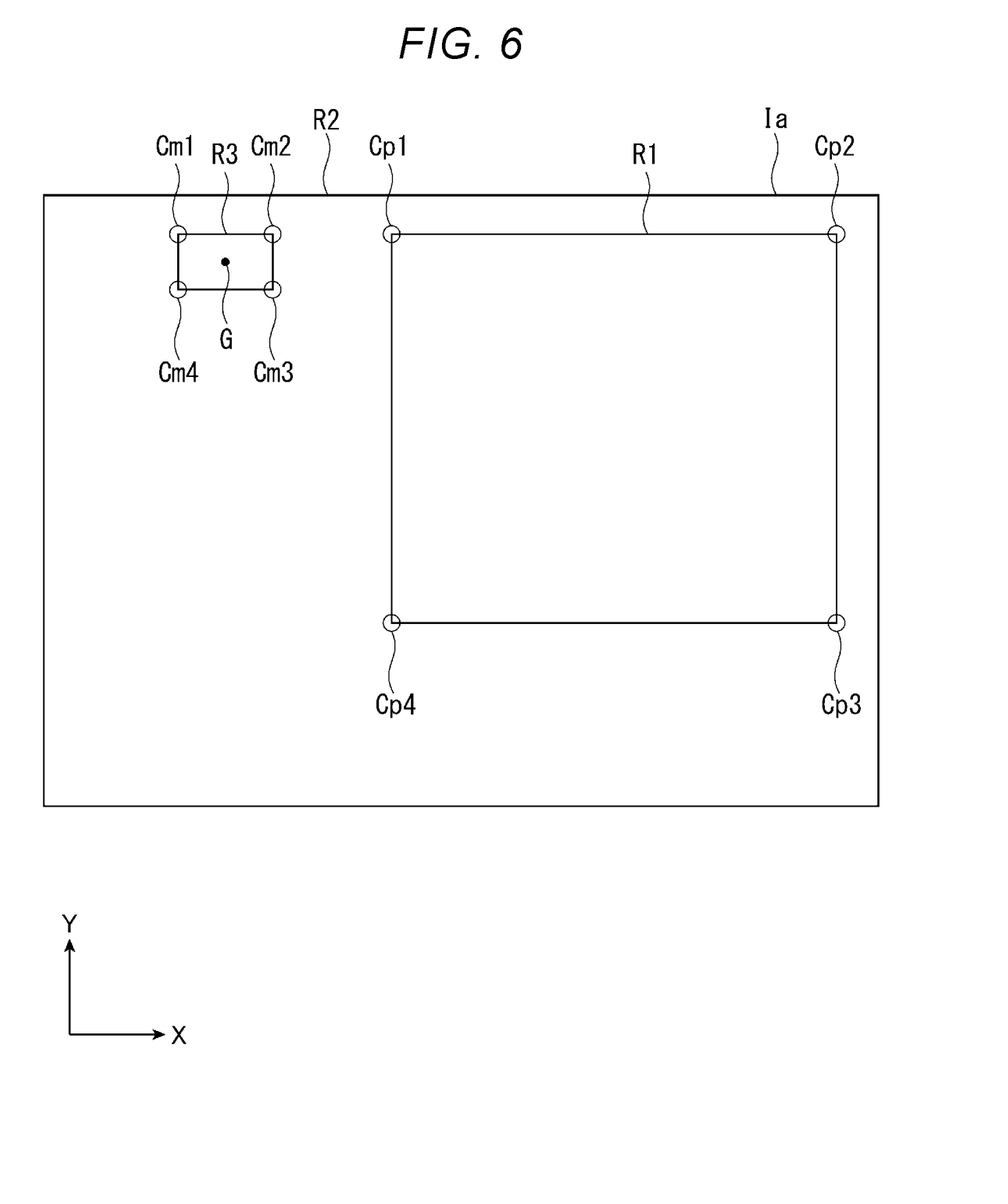
FIG. 6 is a schematic view showing an example of an analysis image in the embodiment.

Next, the spectrum computation unit 241 acquires the plurality of spectral images from the spectroscopic camera 3 and computes the optical spectrum of each pixel, based on the plurality of spectral images (step S14; spectrum computation step). Thus, an analysis image Ia as shown in FIG. 6 is generated.

The analysis image Ia is segmented into a plurality of pixel areas, based on the optical spectrum of each pixel.

The projection image Ip is an image projected with visible light and therefore has the highest reflection intensity around a wavelength of 680 nm. Therefore, a pixel area having a maximum intensity around a wavelength of 680 nm is defined as a projection image area R1.

A pixel area showing a different optical spectrum from the optical spectrum of the projection image area R1, in the periphery of the projection image area R1, is defined as a background area R2.

A pixel area surrounded by the background area R2 and showing a different optical spectrum from that of the projection image area R1 and the background area R2 is defined as a marker area R3.

The feature point detection unit 242 detects a boundary line of the marker area R3 in the analysis image Ia and derives corners Cm1 to Cm4 of the boundary line. The feature point detection unit 242 then detects the centroid with respect to the four corner points Cm1 to Cm4, as a feature point G (step S15; feature point detection step).

Next, the projection position calculation unit 243 detects a boundary line of the projection image area R1 in the analysis image Ia and derives corners Cp1 to Cp4 of the boundary line. Then, as the relative position of the projection image Ip to the feature point G, the projection position calculation unit 243 calculates coordinates (Xa1,Ya1) to (Xa4,Ya4) of the corners Cp1 to Cp4, with the feature point G defined as the origin (step S16; projection position calculation step).

Subsequently, the projection position calculation unit 243 stores the coordinates (Xa1,Ya1) to (Xa4,Ya4) calculated at step S16 into the storage unit 234, as an initial position of the projection image Ip (step S17).

The initial setting of the image projection system 1 thus ends.

Operation of Image Projection System 1

Figure 7:
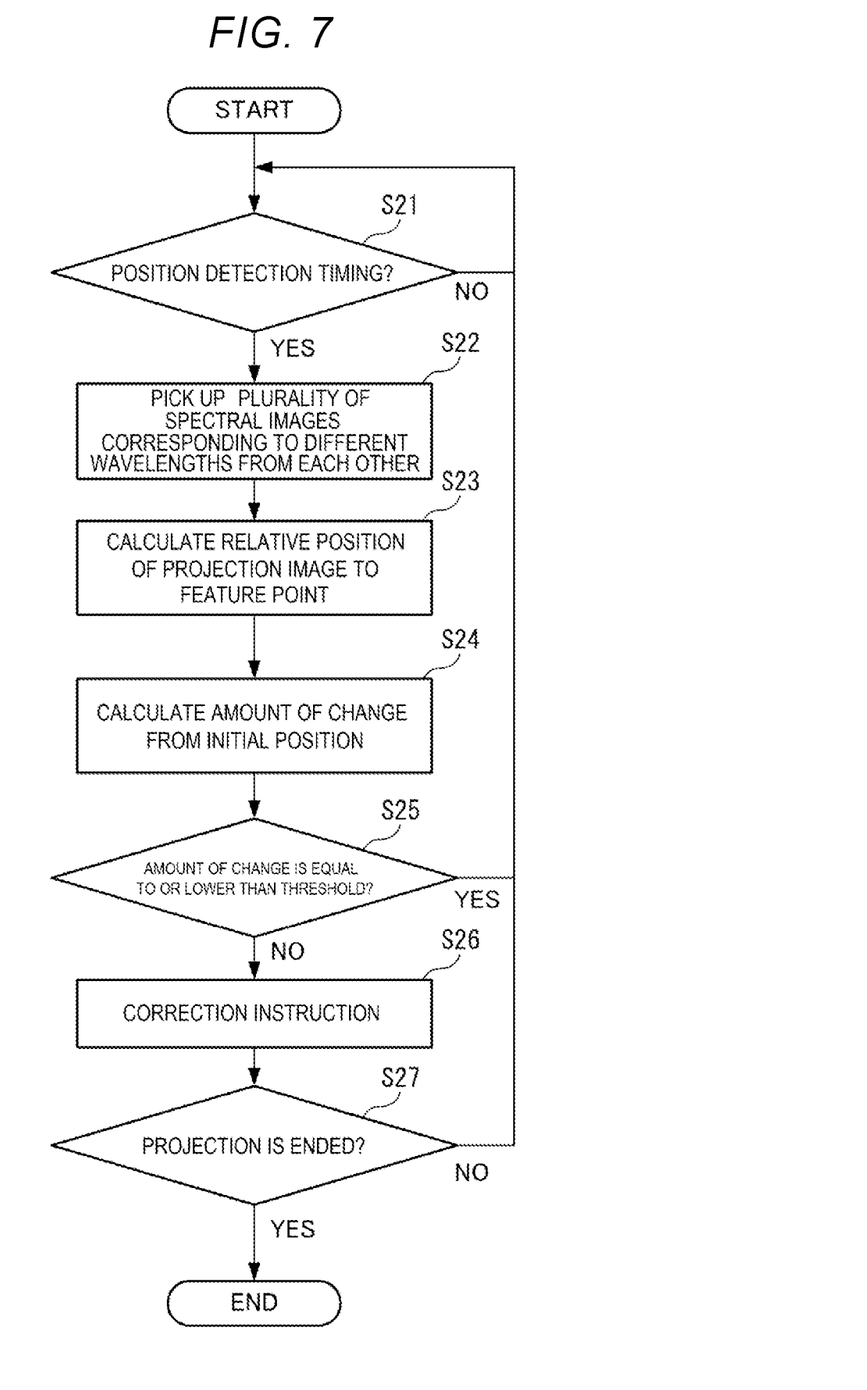
FIG. 7 is a flowchart explaining an operation of the image projection system according to the embodiment.

The operation of the image projection system 1 will now be described with reference to the flowchart of FIG. 7. The flowchart of FIG. 7 is started as the projector 2 starts projecting the projection image Ip.

First, the spectroscopic camera 3 determines whether the current time is a position detection timing or not (step S21). When the result of the determination is Yes, the processing goes to step S22. When the result of the determination is No, the processing waits until it is Yes. The position detection is set, for example, every predetermined time period.

Next, the spectroscopic camera 3 picks up a plurality of spectral images corresponding to different wavelengths from each other (step S22). Based on the plurality of spectral images that are picked up, the projection position control unit 240 calculates the relative position of the projection image Ip to the feature point G, that is, coordinates (Xb1, Yb1) to (Xb4,Yb4) of the corners Cp1 to Cp4 with the feature point G defined as the origin (step S23).

Step S22 is similar to the foregoing step S13. Step S23 is similar to the foregoing steps S14 to S16.

Next, the correction instruction unit 244 compares the coordinates (Xb1,Yb1) to (Xb4,Yb4) calculated in step S23 with the initial position (Xa1,Ya1) to (Xa4,Ya4) stored in the storage unit 234 and calculates amounts of change ($\Delta$X1, $\Delta$Y1) to ($\Delta$X4,$\Delta$Y4) from the initial position (step S24).

Next, the correction instruction unit 244 determines whether the amounts of change ($\Delta$X1,$\Delta$Y1) to ($\Delta$X4,$\Delta$Y4) calculated in step S24 are equal to or lower than a preset threshold in terms of each of the X coordinate and the Y coordinate, or not (step S25).

When it is determined that the amounts of change ($\Delta$X1, $\Delta$Y1) to ($\Delta$X4,$\Delta$Y4) are equal to or lower than the threshold in terms of both the X coordinate and the Y coordinate (Yes in step S25), the processing returns to step S21.

Meanwhile, when it is determined that the amounts of change ($\Delta$X1,$\Delta$Y1) to ($\Delta$X4,$\Delta$Y4) are not equal to or lower than the threshold in terms of at least one of the X coordinate and the Y coordinate (No in step S25), the processing goes to step S26.

Next, the correction instruction unit 244 determines whether there is a shift from the initial state in terms of the position, size or shape of the projection image Ip, based on the amounts of change ($\Delta$X1,$\Delta$Y1) to ($\Delta$X4,$\Delta$Y4), and outputs a correction instruction to the lens control unit 233 or the image processing unit 231, based on the result of the determination (step S26).

Figure 8:
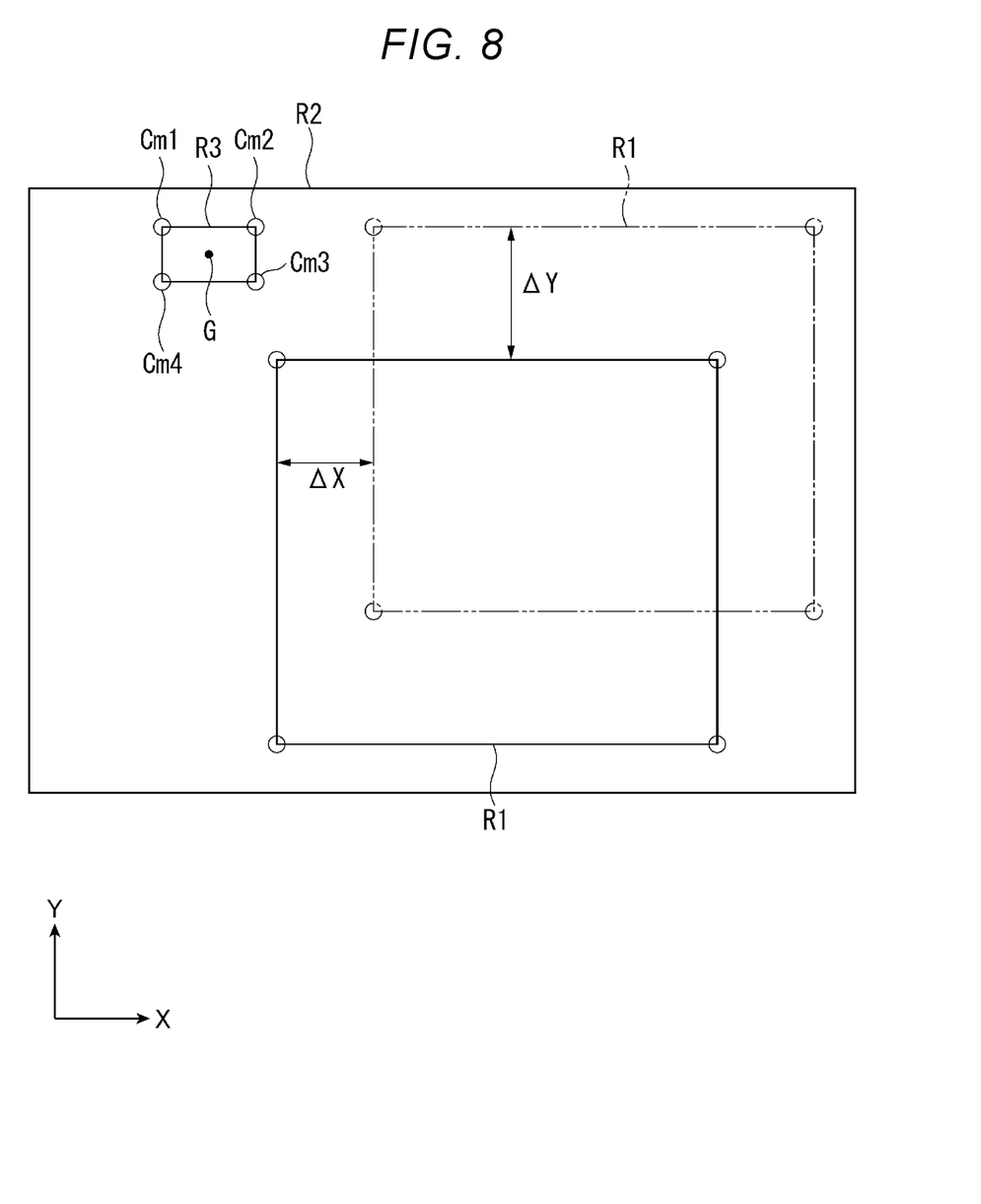
FIG. 8 is a schematic view showing an example of an analysis image in the embodiment.

For example, FIG. 8 shows an analysis image Ia in the case where the projection image Ip is shifted along the Y-axis and the X-axis from the initial position. In FIG. 8, the projection image area R1 at the initial position is indicated by a dashed line, and the current projection image area R1 is indicated by a solid line.

In the example shown in FIG. 8, the amounts of change $\Delta$X1 to $\Delta$X4 are values equal to each other ($\Delta$X in FIG. 8), and the amounts of change $\Delta$Y1 to $\Delta$Y4 are values equal to each other ($\Delta$Y in FIG. 8). In such a case, the correction instruction unit 244 determines that the projection image Ip is shifted in position, and outputs a correction instruction based on the amount of change ($\Delta$X,$\Delta$Y), to the lens control unit 233. The lens control unit 233, to which this correction instruction is inputted, controls the X shift unit 221, based on the amount of change $\Delta$X, and controls the Y shift unit 222, based on the amount of change $\Delta$Y. Thus, the X shift unit 221 and the Y shift unit 222 moves the projection lens 213 along the X-axis and the Y-axis in such a way that the position of the projection image Ip becomes closer to the initial position. That is, the projection image Ip is controlled in such a way as to maintain a predetermined projection position.

When it is determined that the projection image Ip is changed in size, the correction instruction unit 244 outputs a correction instruction based on the amounts of change ($\Delta$X1,$\Delta$Y1) to ($\Delta$X4,$\Delta$Y4), to the lens control unit 233. The lens control unit 233 controls the zoom unit 223, based on the correction instruction, and thus makes the size of the projection image Ip closer to the initial state.

When it is determined that the projection image Ip is changed in shape, the correction instruction unit 244 outputs a correction instruction based on the amounts of change ($\Delta$X1,$\Delta$Y1) to ($\Delta$X4,$\Delta$Y4), to the image processing unit 231. The image processing unit 231 corrects the data of the projection image Ip, based on the correction instruction, and thus makes the shape of the projection image Ip closer to the initial state.

When the projection is ended as the power of the projector 2 is turned off or the like (Yes in step S27), this flow ends. Meanwhile, when projection continues (No in step S27), the processing returns to step S21 and the flow is repeated.

Effects of this Embodiment

The projection position detection device 100 and the image projection system 1 according to the foregoing embodiment can achieve the following effects.

(1) The projection position detection device 100 according to the embodiment includes: the spectroscopic camera 3 receiving light from an image pickup range including the projection image Ip projected onto the projection target 101, and picking up a plurality of spectral images corresponding to different wavelengths from each other; the spectrum computation unit 241 computing an optical spectrum of each pixel, based on the plurality of spectral images; the feature point detection unit 242 detecting the feature point G in the image pickup range, based on the optical spectrum of the pixel; and the projection position calculation unit 243 calculating a relative position of the projection image Ip to the feature point G.

According to such a configuration, the feature point G detected in the image pickup range of the spectroscopic camera 3 serves as a reference point for calculating the projection position of the projection image Ip. Therefore, the projection position of the projection image Ip can be set regardless of the type of the projection target 101. Thus, when the projection position of the projection image Ip is shifted due to vibration at the installation site or a touch by a human or the like, this shift can be easily detected.

(2) In the embodiment, projection position detection device, the spectroscopic camera 3 includes: the variable-wavelength interference filter 33 having the pair of reflection films 331, 332 facing each other and the electrostatic actuator 333 changing the dimension of the gap between the pair of reflection films 331, 332; and the image pickup element 34 picking up an image of light transmitted through the variable-wavelength interference filter 33.

In such a configuration, light of a plurality of wavelengths is received at the same pixel of the image pickup element 34. Therefore, the feature point G in the image pickup range can be detected with high accuracy and high resolution.

(3) In the embodiment, the spectroscopic camera 3 picks up a spectral image corresponding to a wavelength in a near-infrared range.

The related-art system described JP-A-2004-341029 uses a general camera. Therefore, a picked-up image picked up in a dark space is obscure and it is difficult to detect the corners of the screen, based on such a picked-up image. That is, it is difficult to detect the projection position of the projection image in a dark space.

In contrast, in the embodiment, a spectral image corresponding to a wavelength in a near-infrared range is picked up, and the projection position of the projection image Ip is detected, based on this spectral image. The wavelength in the near-infrared range can make visible the difference in light reflectivity due to the composition of the target object. Therefore, the projection position of the projection image Ip can be properly detected even in a dark space.

(4) The spectroscopic camera 3 in the embodiment further includes the near-infrared light source 31 casting light including a wavelength in a near-infrared range, onto the projection target 101.

According to such a configuration, the projection position of the projection image Ip can be more properly detected even in a dark space, as described above. Also, the light of a wavelength in the near-infrared range is invisible to human eyes and therefore does not change the color tone of the projection image Ip. Moreover, this light enables the projection image Ip to appear sharply, without decreasing the bright/dark contrast by illumination.

(5) The image projection system 1 in the embodiment includes: the foregoing projection position detection device 100; the projection lens 213 projecting the projection image Ip onto the projection target 101; the lens adjustment mechanism 22 performing optical axis adjustment or zoom adjustment of the projection lens 213; and the lens control unit 233 controlling the lens adjustment mechanism 22, based on the amount of change in the relative position of the projection image Ip to the feature point G.

According to such a configuration, the projection image Ip can be controlled to be at a predetermined position or in a predetermined size.

(6) The image projection system 1 in the embodiment includes: the foregoing projection position detection device 100; and the image processing unit 231 correcting the projection image Ip, based on the amount of change in the relative position of the projection image Ip to the feature point G.

According to such a configuration, the projection image Ip can be controlled to be in a predetermined shape.

As a related art, there is a technique of projecting a pattern image onto a projection target, then picking up the pattern image, and thus correcting a parameter of a projection image. JP-A-2008-287426 is an example of this technique. However, in such a related-art technique, the original projection of the projection image must be interrupted in order to project the pattern image.

In contrast, in the embodiment, the projection position of the projection image Ip can be controlled without interrupting the projection of the projection image Ip.

MODIFICATION EXAMPLES

The present disclosure is not limited to the foregoing embodiment and includes modifications, improvements and the like within a range that can achieve the object of the present disclosure.

Modification Example 1

In the embodiment, the centroid with respect to the corners Cm1 to Cm4 of the marker area R3 is detected as the feature point G. However, this is not limiting.

For example, each of the corners Cm1 to Cm4 of the marker area R3 may be detected as a feature point, and the relative position of the corners Cp1 to Cp4 of the projection image area R1 to these feature points may be calculated respectively.

Alternatively, one of the detected corners Cm1 to Cm4 of the marker area R3 may be detected as a feature point.

Modification Example 2

In the embodiment, a rectangular plate is detected as the marker M. However, this is not limiting.

For example, the marker M may be an unevenness in painting, a stain, a scratch or the like appearing on the wall surface that is the projection target 101. In such a case, a general image processing technique can be used to detect a feature point. As an example of this, the center of an inscribed circle or a circumscribed circle at an edge forming a stain may be detected as a feature point.

Modification Example 3

In the embodiment, the coordinates of the four corners Cp1 to Cp4 of the projection image area R1 are calculated as the projection position of the projection image Ip. However, this is not limiting.

For example, when a large shift is not assumed, the coordinates of at least one of the four corners Cp1 to Cp4 of the projection image area R1 may be calculated.

Also, the centroid with respect to the corners Cp1 to Cp4 of the projection image area R1 may be used as the projection position of the projection image Ip.

Alternatively, an arbitrary point on the boundary line of the projection image area R1 may be used as the projection position of the projection image Ip.

Modification Example 4

In the embodiment, the spectroscopic camera 3 picks up a spectral image corresponding to a wavelength in a near-infrared range. However, the spectroscopic camera 3 may pickup a spectral image corresponding to a wavelength in an ultraviolet range. The spectroscopic camera 3 may also have a light source casting light including a wavelength in an ultraviolet range onto the projection target 101. Similarly to near-infrared light, ultraviolet light is invisible to human eyes and therefore does not change the color tone of the projection image Ip.

Modification Example 5

In the embodiment, the lens adjustment mechanism 22 controls the position and size of the projection image Ip, and the image processing unit 231 controls the shape of the projection image Ip. However, this is not limiting. For example, when the projection image Ip is an image projected in a smaller area than the projectable range of the projector 2, the image processing unit 231 may control the position and size of the projection image Ip.

Modification Example 6

In the embodiment, the spectroscopic camera 3 has the variable-wavelength interference filter 33. However, the spectroscopic camera 3 may have another spectral filter.

Modification Example 7

In the embodiment, the projector 2 and the spectroscopic camera 3 are formed separately from each other. However, these may be unified together.

What is claimed is:

1. A projection position detection device comprising:
a spectroscopic camera configured to receive light from a projection target, the projection target having a background, a marker, and a projected image area, a projected image being projected on the projected image area, the spectroscopic camera being configured to capture a plurality of spectral images corresponding to different wavelengths from each other of the projection target based on the received light, optical spectrums of the background, the marker, and the projected image on the projected image area of the projection target being different from each other;
a memory configured to store a program; and
a processor configured to execute the program so as to:
cause the spectroscopic camera to capture the plurality of spectral images of the projection target;
obtain the optical spectrums of every pixel of the captured plurality of spectral images;
determine a position of the marker on the projection target based on the obtained optical spectrums;
determine an area of the projected image on the projection target based on the obtained optical spectrums; and
determine a relative position between the marker and the projected image.

2. The projection position detection device according to claim 1, wherein
the spectroscopic camera includes:
a variable-wavelength interference filter having a pair of reflection films facing each other and a gap changing unit that is configured to change a dimension of a gap between the pair of reflection films; and
an image pickup element configured to capture the plurality of spectral images corresponding to the light transmitted through the variable-wavelength interference filter.

3. The projection position detection device according to claim 1, wherein
each of the plurality of spectral images corresponds to a wavelength in a near-infrared range.

4. The projection position detection device according to claim 3, further comprising
a light source configured to emit light including the wavelength in the near-infrared range onto the projection target.

5. An image projection system comprising:
a projection position detection device, the projection position detection device including:
a spectroscopic camera configured to receive light from a projection target, the projection target having a background, a marker, and a projected image area, a projected image being projected on the projected image area, the spectroscopic camera being configured to capture a plurality of spectral images corresponding to different wavelengths from each other of the projection target based on the received light, optical spectrums of the background, the marker, and the projected image on the projected image area of the projection target being different from each other;
a memory configured to store a program; and
a processor configured to execute the program so as to:
cause the spectroscopic camera to capture the plurality of spectral images of the projection target;
obtain the optical spectrums of every pixel of the captured plurality of spectral images;
determine a position of the marker on the projection target based on the obtained optical spectrums;
determine an area of the projected image on the projection target based on the obtained optical spectrums; and
determine a relative position between the marker and the projected image;
a projection lens configured to project the projection image onto the projection target;
a lens adjustment mechanism configured to perform optical axis adjustment or zoom adjustment of the projection lens; and
a lens controller configured to control the lens adjustment mechanism based on an amount of change in the relative position of the projection image to the feature point.

6. The image projection system according to claim 5, further comprising:
an image processor configured to correct the projection image based on an amount of change in the relative position of the projection image to the feature point.

7. A projection position detection method for causing a processor to execute a program stored in a memory, the method comprising executing on the processor the steps of:
receiving light from a projection target, the projection target having a background, a marker, and a projected image area, a projected image being projected on the projected image area;
capturing a plurality of spectral images corresponding to different wavelengths from each other of the projection target based on the received light, optical spectrums of the background, the marker, and the projected image on the projected image area of the projection target being different from each other;
obtaining the optical spectrums of every pixel of the captured plurality of spectral images;
determining a position of the marker on the projection target based on the obtained optical spectrums;
determining an area of the projected image on the projection target based on the obtained optical spectrums; and
determining a relative position between the marker and the projected image.

* * * * *